(12) United States Patent
Luo

(10) Patent No.: US 11,272,380 B2
(45) Date of Patent: Mar. 8, 2022

(54) METHODS AND APPARATUS FOR MANAGING CODE BLOCK INTERLEAVING

(71) Applicant: QUALCOMM Incorporated, San Diego, CA (US)

(72) Inventor: Tao Luo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 15/604,417

(22) Filed: May 24, 2017

(65) Prior Publication Data

US 2018/0167829 A1    Jun. 14, 2018

Related U.S. Application Data

(60) Provisional application No. 62/433,451, filed on Dec. 13, 2016.

(51) Int. Cl.

| | |
|---|---|
| *H04W 24/02* | (2009.01) |
| *H04W 72/10* | (2009.01) |
| *H04W 24/08* | (2009.01) |
| *H04W 72/04* | (2009.01) |
| *H04L 1/00* | (2006.01) |

(52) U.S. Cl.
CPC .......... *H04W 24/02* (2013.01); *H04L 1/0058* (2013.01); *H04L 1/0071* (2013.01); *H04W 24/08* (2013.01); *H04W 72/042* (2013.01); *H04W 72/10* (2013.01); *H04L 1/0006* (2013.01);
(Continued)

(58) Field of Classification Search
CPC .... H04L 1/0058; H04L 1/0071; H04L 1/0078
See application file for complete search history.

(56) References Cited

U.S. PATENT DOCUMENTS

| | | |
|---|---|---|
| 9,807,755 B2 | 10/2017 | Kim et al. |
| 10,148,380 B2 | 12/2018 | Uchiyama et al. |
| (Continued) | | |

FOREIGN PATENT DOCUMENTS

| | | |
|---|---|---|
| CN | 101467354 A | 6/2009 |
| JP | 2004343652 A | 12/2004 |
| (Continued) | | |

OTHER PUBLICATIONS

International Search Report and Written Opinion—PCT/US2017/064259—ISA/EPO—dated Mar. 26, 2018.
(Continued)

*Primary Examiner* — Jeffrey M Rutkowski
*Assistant Examiner* — Chae S Lee
(74) *Attorney, Agent, or Firm* — Patterson+ Sheridan, L.L.P.

(57) ABSTRACT

Methods and apparatus are provided for managing code block interleaving and de-interleaving in wireless communication systems. A transmitter detects one or more conditions related to transmissions to be made from the transmitter and decides, based on the detection, to disable an interleaver while processing the transmissions, the interleaver used to spread code blocks over available resources. A receiver detects one or more conditions relating to the transmissions from the transmitter and determines, based on the detection, whether an interleaver was used at the transmitter while processing the transmissions. The receiver decides whether or not to de-interleave code blocks of the received transmission based on the determination.

8 Claims, 9 Drawing Sheets

(52) U.S. Cl.
CPC .......... *H04L 1/0009* (2013.01); *H04L 1/0017* (2013.01); *H04L 1/0075* (2013.01)

(56) References Cited

U.S. PATENT DOCUMENTS

| | | | |
|---|---|---|---|
| 10,154,480 B2 | 12/2018 | Kim et al. | |
| 2004/0014447 A1 | 1/2004 | Hepler et al. | |
| 2008/0317146 A1* | 12/2008 | Kwon | H04L 1/0071 375/260 |
| 2010/0223524 A1* | 9/2010 | Duggan | H03M 13/3707 714/751 |
| 2011/0243066 A1* | 10/2011 | Nayeb Nazar | H04L 1/0057 370/328 |
| 2012/0093014 A1* | 4/2012 | Hong | H03M 13/2732 370/252 |
| 2013/0176952 A1* | 7/2013 | Shin | H04L 5/001 370/329 |
| 2015/0092545 A1* | 4/2015 | Katar | H04B 3/542 370/230 |
| 2015/0139135 A1 | 5/2015 | Kim et al. | |
| 2016/0173233 A1 | 6/2016 | Loghin et al. | |
| 2016/0197757 A1 | 7/2016 | Baek et al. | |
| 2016/0269047 A1 | 9/2016 | Jiang et al. | |
| 2017/0026943 A1* | 1/2017 | Kim | H04W 72/0426 |
| 2017/0163461 A1* | 6/2017 | Baek | H04L 27/2613 |

FOREIGN PATENT DOCUMENTS

| | | |
|---|---|---|
| JP | 2006501703 A | 1/2006 |
| JP | 2007201649 A | 8/2007 |
| JP | 2009273040 A | 11/2009 |
| JP | 2010068201 A | 3/2010 |
| JP | 2010157990 A | 7/2010 |
| JP | 2012235339 A | 11/2012 |

OTHER PUBLICATIONS

Nokia Siemens Networks et al., "Time Interleaving for LTE Shared TrCH Processing", 3GPP Draft; R1-072967_TIMEIL, 3rd Generation Partnership Project (3GPP), Mobile Competence Centre; 650, Route Des Lucioles; F-06921 Sophia-Antipolis Cedex; France, vol. RAN WG1, No. Orlando, USA; 20070620, Jun. 20, 2007 Jun. 20, 2007), XP050106632, 4 Pages, [retrieved on Jun. 20, 2007].
LG-Nortel: "Resource Wastage in R-PDCCH for TDM+FDM & FDM Configurations", 3GPP TSG RAN WG1 #60bis, 3GPP Draft; R1-102241, Beijing, China, Apr. 12-16, 2010, 12 Pages.
ZTE: "Design of Demodulation Reference Signals in Backhaul Downlink", TSG-RAN WG1 #59, 3GPP Draft; R1-094747, Jeju, Korea, Nov. 9-13, 2009, pp. 1-4.
Taiwan Search Report—TW106142348—TIPO—dated Jan. 23, 2021.
Qualcomm Incorporated: "UCI Transmission for CA, " 3GPP TSG RAN WG1 #62, R1-104793, Aug. 23-27, 2010, Madrid, Spain, 4 pages.
3GPP TS 38.212 V15.1.0 (Mar. 2018), 3rd Generation Partnership Project; Technical Specification Group Radio Access Network; NR; Multiplexing and channel coding (Release 15), pp. 1-90.
LG Electronics Inc: "Search Space Design for Interleaved R-PDCCH [online]", TSG-RAN WG1 Meeting #62, R1-104656, Aug. 17, 2010, 6 Pages, Internet URL: https://www.3gpp.org/ftp/tsg_ran/WG1_RL1/TSGR1_62/Docs/R1-104656.zip.
Panasonic., et al., "Way Forward on Non-Interleaving R-PDDCH VRB to PRB Mapping[online]", 3GPP TSG RAN WG1 #63, R1-106320, Nov. 10, 2010, 3Pages, Internet URL: https://www.3gpp.org/ftp/tsg_ran/WG1_RL1/TSGR1_63/Docs/R1-106320.zip.

* cited by examiner

METHODS AND APPARATUS FOR MANAGING CODE BLOCK INTERLEAVING

This application claims priority to U.S. Provisional Application Ser. No. 62/433,451 entitled "METHODS AND APPARATUS FOR MANAGING CODE BLOCK INTERLEAVING", filed on Dec. 13, 2016, which is expressly incorporated by reference in its entirety.

FIELD

The present disclosure relates generally to wireless communication, and more particularly, to methods and apparatus for managing code block interleaving and de-interleaving in wireless communication systems.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a transmitter. The method generally includes detecting one or more conditions related to transmissions to be made from the transmitter, and deciding, based on the detection, to disable an interleaver while processing the transmissions, the interleaver used to spread code blocks over available resources.

Certain aspects of the present disclosure provide a method for wireless communications by a receiver. The method generally includes detecting one or more conditions relating to transmissions received from a transmitter, determining, based at least on the detection, whether an interleaver was used to spread code blocks over available resources while processing the transmissions, and deciding whether or not to de-interleave code blocks of the received transmissions based on the determination.

Certain aspects of the present disclosure provide an apparatus for wireless communication by a transmitter. The apparatus generally includes means for detecting one or more conditions related to transmissions to be made from the transmitter, and means for deciding, based on the detection, to disable an interleaver while processing the transmissions, the interleaver used to spread code blocks over available resources.

Certain aspects of the present disclosure provide an apparatus for wireless communications by a receiver. The apparatus generally includes means for detecting one or more conditions relating to transmissions received from a transmitter, means for determining, based at least on the detection, whether an interleaver was used to spread code blocks over available resources while processing the transmissions, and means for deciding whether or not to de-interleave code blocks of the received transmissions based on the determination.

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), LTE in an unlicensed spectrum (LTE-whitespace), etc.

DETAILED DESCRIPTION

Figure 1:
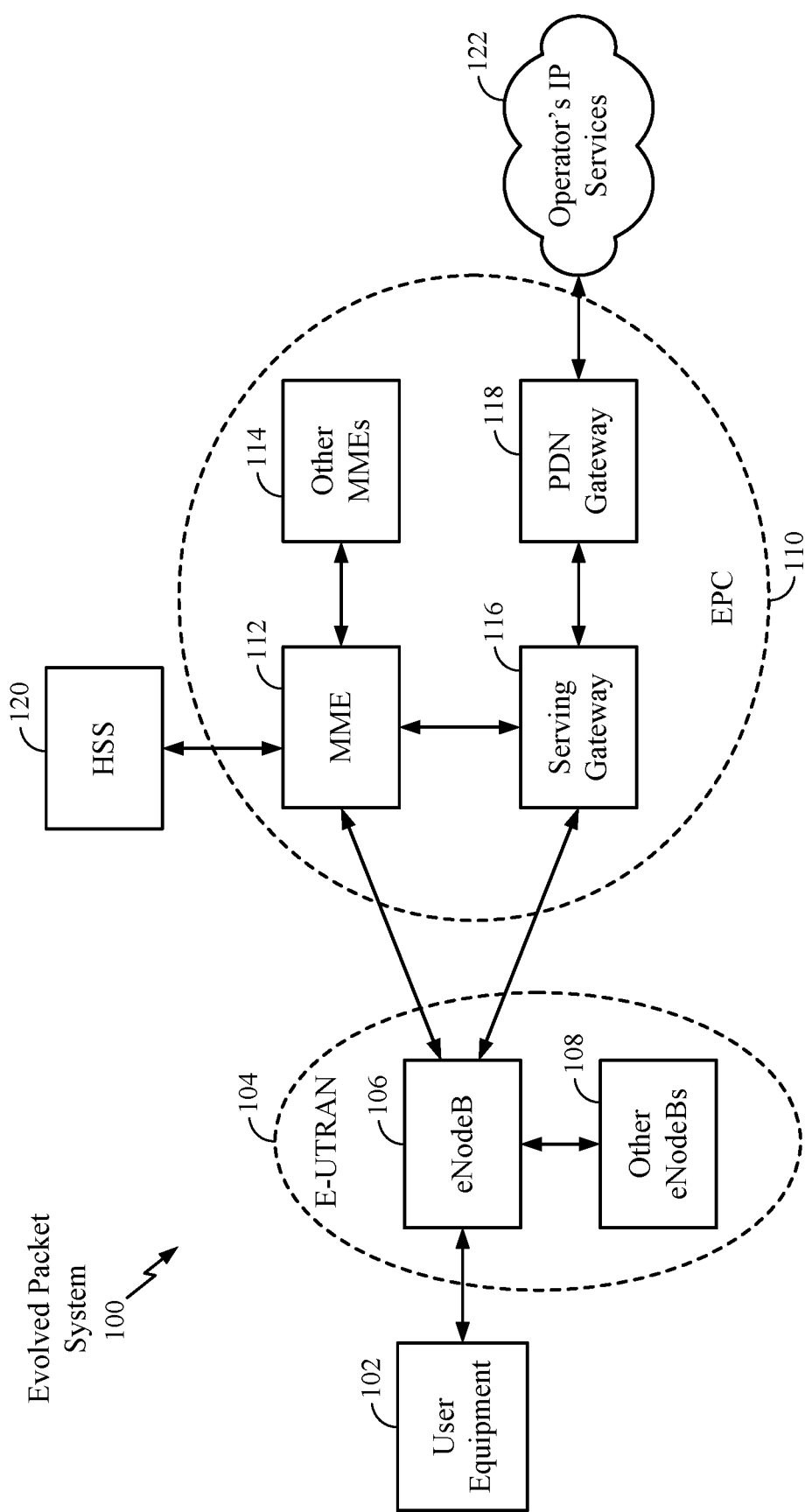
FIG. 1 is a diagram illustrating an example of a network architecture.

In LTE, processing of data for transmission on the downlink (e.g., on PDSCH) and the uplink (e.g., on PUSCH) generally includes generation of one or more transport blocks (TB). A TB is a MAC (Medium Access Control) PDU (Protocol Data Unit) that is delivered to the physical layer. Transport blocks are typically further divided into smaller size code blocks (CB), which is referred as code block segmentation before being applied to channel coding/rate matching modules in the physical layer. The code blocks undergo turbo coding, which is a form of forward error correction that improves the channel capacity by adding redundant information. Turbo coding typically includes a turbo interleaver that spreads out the code blocks over an assigned resource. The role of the interleaver is to spread the information bits such that in the event of a burst error, different code streams are affected differently, allowing data to still be recovered.

However, using a code block interleaver may not always be beneficial, and in fact may reduce efficiency in certain conditions. For example, for small RB allocations or MTC (Machine Type Communication) applications with small data transfer (e.g., one or two CBs) it may be sufficient to allocate resources such that the CBs naturally spread over the resource allocation to achieve diversity. Code block interleaving may not be necessary in this case and may add unnecessary processing. Another example, where code block interleaving may be avoided to speed up processing is in case of critical applications identified as having a higher priority than one or more other applications.

Certain aspects of the present disclosure discuss techniques for managing code block interleaving more efficiently as compared to legacy systems. For example, these techniques include selectively disabling interleaving at transmitters and corresponding de-interleaving at receivers based on certain conditions to increase general efficiency of transmit and receive chains respectively.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced.

For example, a transmitter at a base station (e.g., 106, 108 etc.) or at a UE (e.g., UE 102) may detect one or more conditions related to transmissions to be made from the transmitter, and may decide, based on the detection, to disable an interleaver used to spread code blocks over available resources while processing the transmissions. Further, a receiver at a corresponding base station (e.g., 106, 108 etc.) or at a corresponding UE (e.g., UE 102) may detect one or more conditions relating to transmissions received from the transmitter, and may determine, based at least on the detection of the one or more conditions, whether an interleaver was used at the transmitter to spread code blocks over the available resources while processing the transmissions. The receiver may decide whether or not to de-interleave code blocks of the received transmissions based on the determination.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE102 may be coupled to the PDN through the LTE network.

Figure 2:
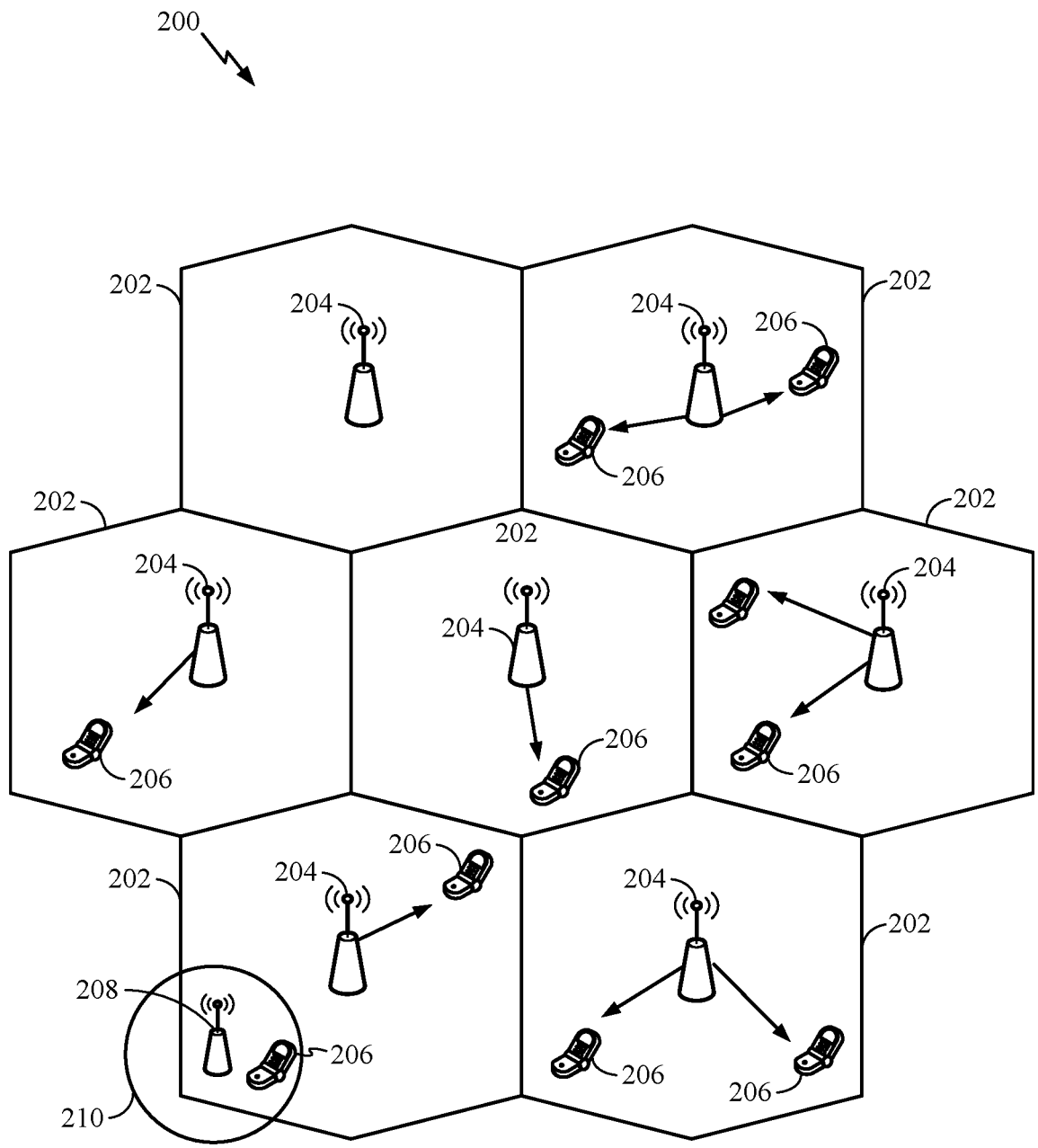
FIG. 2 is a diagram illustrating an example of an access network.

FIG. 2 is a diagram illustrating an example of an access network 200 in an LTE network architecture in which aspects of the present disclosure may be practiced. For example, eNBs 204 and UEs 206 may be configured to implement techniques for managing interleaving at a transmitter and de-interleaving at a receiver, in accordance with certain aspects of the present disclosure.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
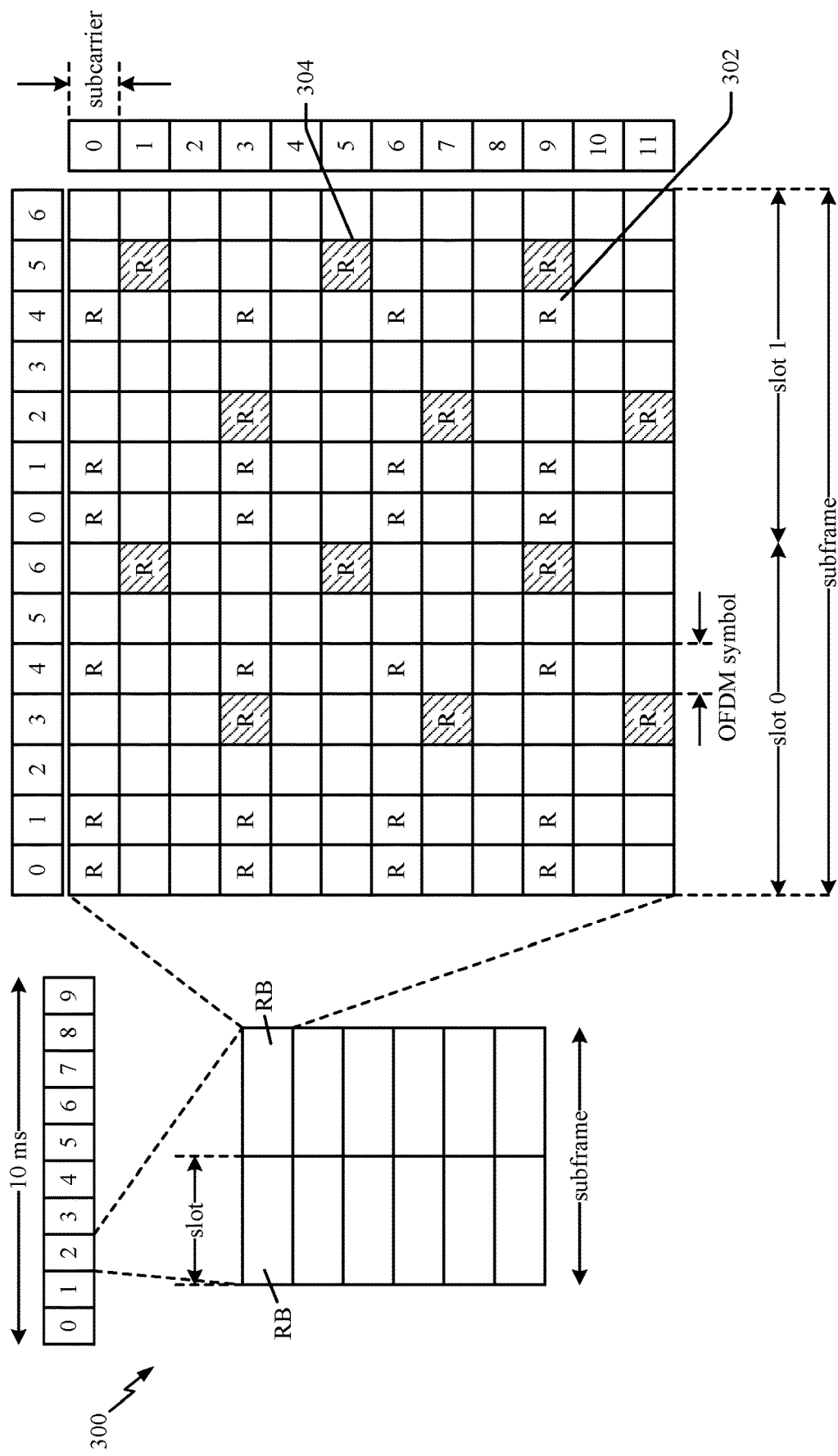
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
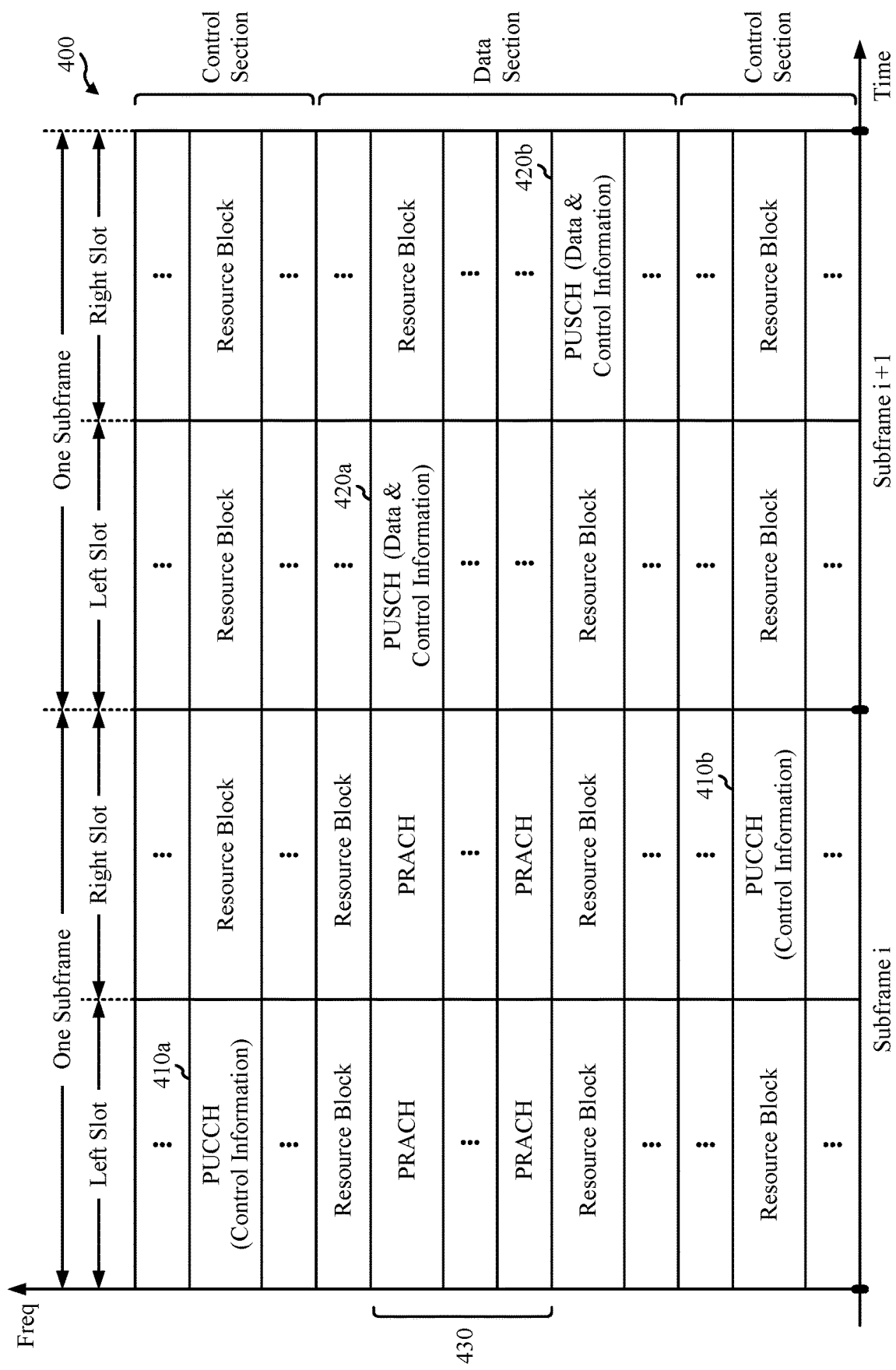
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
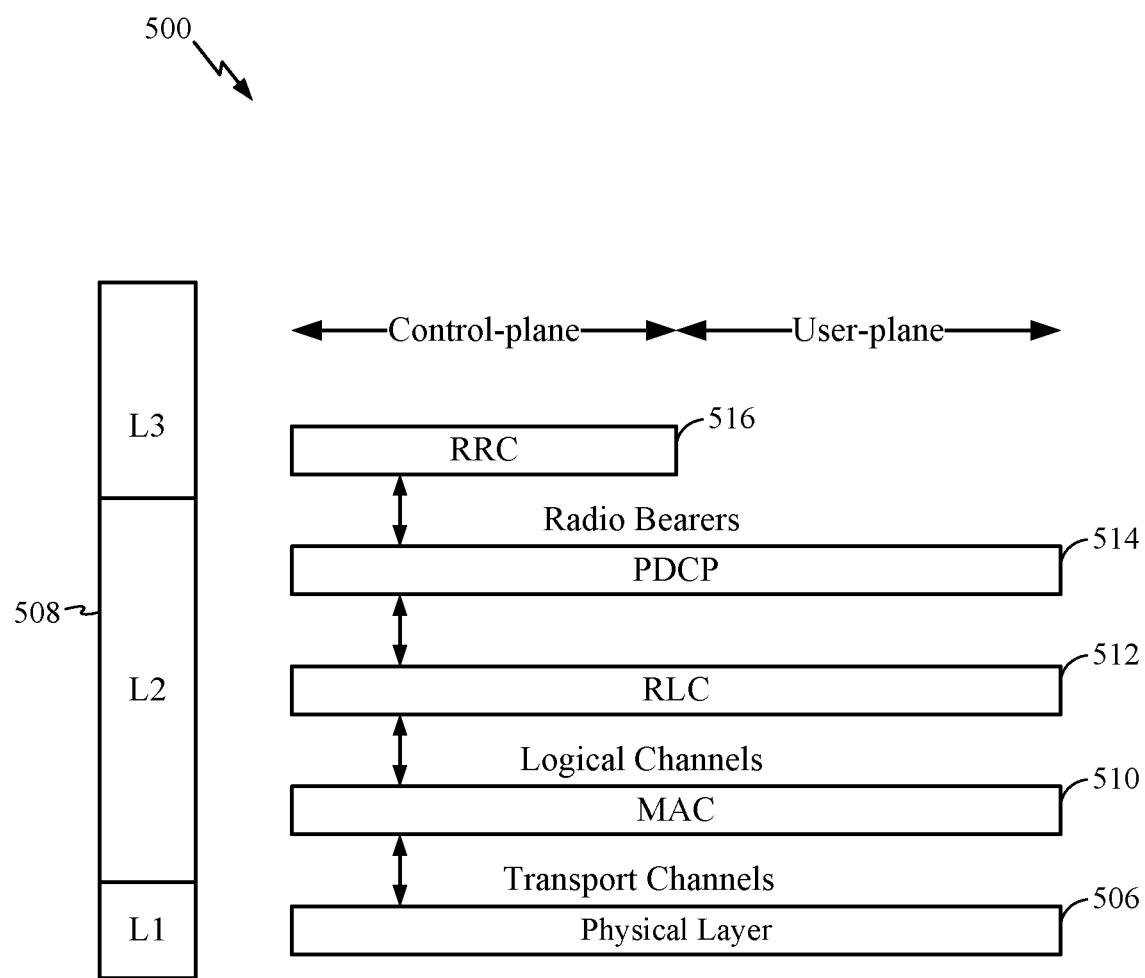
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
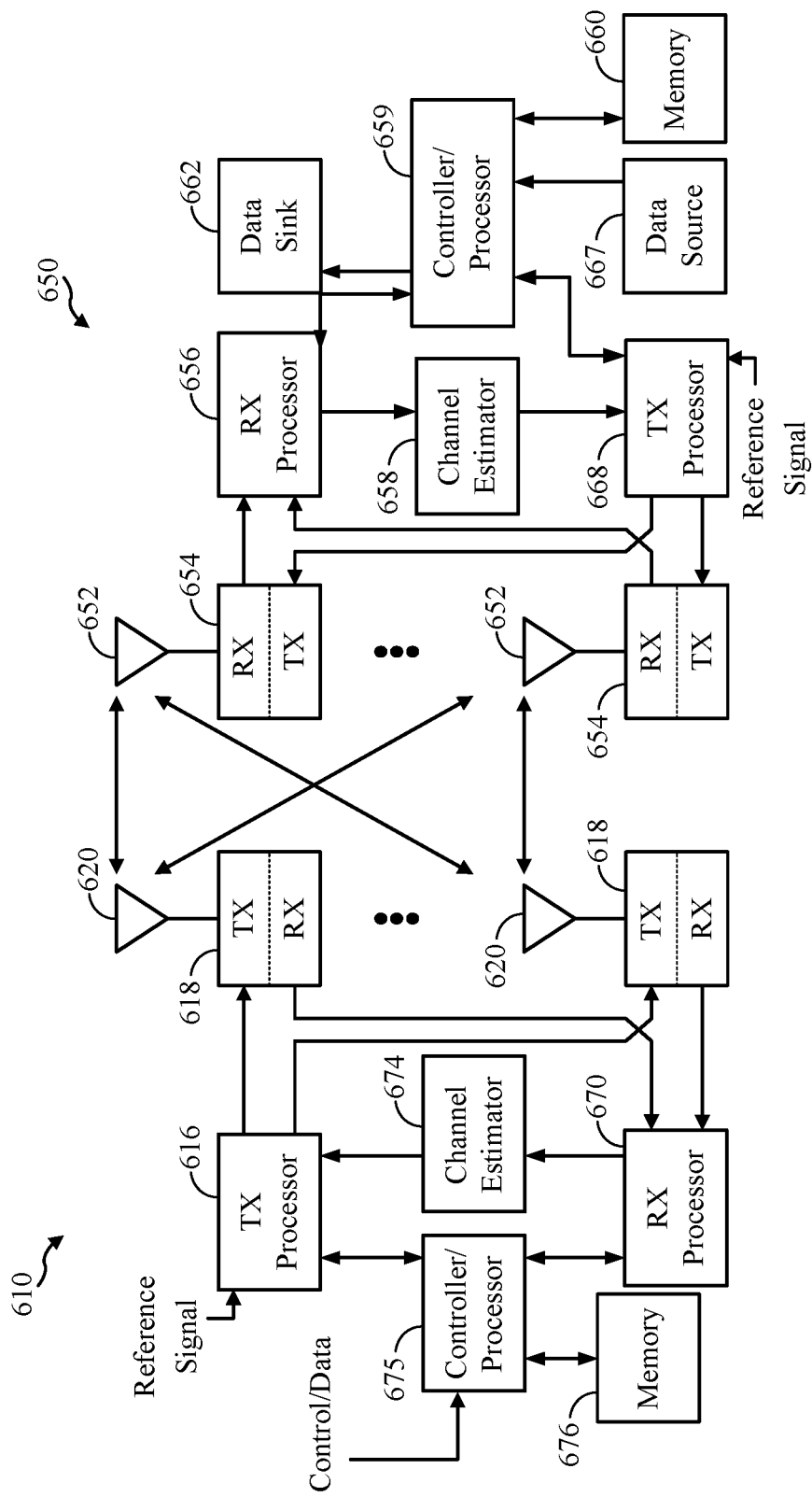
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced.

For example, a transmitter at eNB 610 or at UE 650 may detect one or more conditions related to transmissions to be made from the transmitter, and may decide, based on the detection, to disable an interleaver used to spread code blocks over available resources while processing the transmissions. Further, a receiver at a corresponding eNB 610 or at UE 650 may detect one or more conditions relating to transmissions received from the transmitter, and may determine, based at least on the detection of the one or more conditions, whether an interleaver was used at the transmitter to spread code blocks over the available resources while processing the transmissions. The receiver may decide whether or not to de-interleave code blocks of the received transmissions based on the determination It may be noted that the transmitter noted above implementing the techniques for managing interleaving in accordance with certain aspects of the present disclosure may be implemented by a combination of one or more of the controller 675, TX processor 616 and transmitter 618 at the eNB 610, and by a combination of one or more of controller 659, TX processor 668, and transmitter 654 at the UE 650. Further, the receiver noted above implementing the techniques for managing de-interleaving in accordance with certain aspects of the present disclosure may be implemented by a combination of one or more of the controller 675, RX processor 670, and receiver 618 at the eNB 610, and by a combination of one or more of the controller 659, the RX processor 656 and receiver 654 at the UE 650.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 8:
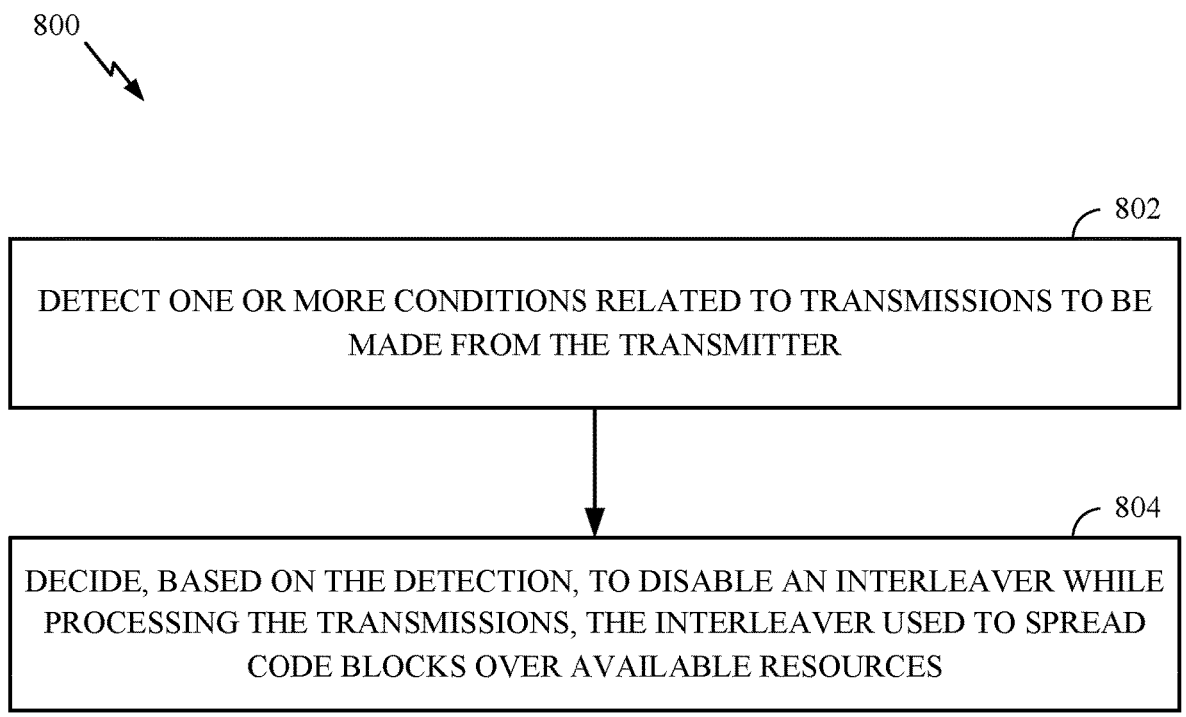
FIG. 8 illustrates example operations that may be performed by a transmitter, for managing interleaving at the transmitter, in accordance with certain aspects of the present disclosure.
Figure 9:
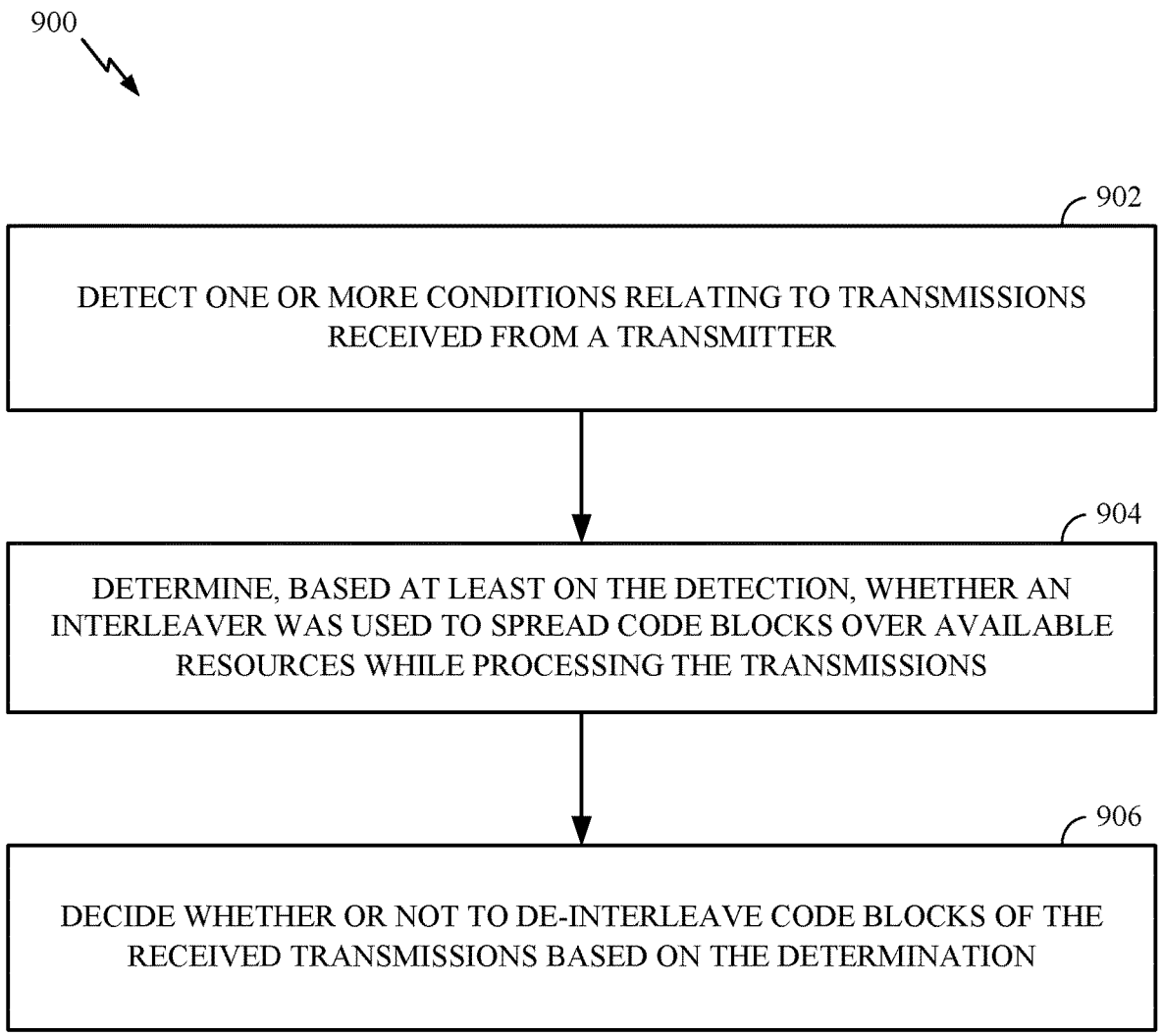
FIG. 9 illustrates example operations that may be performed by a receiver, for managing de-interleaving at the receiver, in accordance with certain aspects of the present disclosure.

The controller/processor 675 and/or other processors and modules at the eNB 610 and the controller/processor 659 and/or other processors and modules at the UE 650 may perform or direct operations, for example, operations 800 in FIG. 8, operations 900 in FIG. 9, and/or other processes for the techniques described herein for interleaving at a transmitter and de-interleaving at a receiver. In certain aspects, one or more of any of the components shown in FIG. 6 may be employed to perform example operations 800 and 900 and/or other processes for the techniques described herein. The memories 660 and 676 may store data and program codes for the UE 650 and eNB 610 respectively, accessible and executable by one or more other components of the UE 650 and the eNB 610.

Example Techniques for Managing Interleaving and De-Interleaving of Code Blocks

Processing of data for transmission on the downlink (e.g., on PDSCH) and the uplink (e.g., on PUSCH) generally includes generation of one or more transport blocks (TB). A TB is a MAC (Medium Access Control) PDU (Protocol Data Unit) that is delivered to the physical layer. At a transmitter, data to be transmitted is first received by a PDCP (Packet Data Compression Protocol) layer. This layer performs compression and ciphering/integrity if applicable. This layer passes on the data to the RLC (Radio Link Control) layer which concatenates it to RLC PDU. The RLC layer concatenates or segments the data coming from the PDCP layer into correct block size and forwards it to the MAC (Medium Access Control) layer with its own header. The MAC layer selects the modulation and coding scheme (MCS) and configures the physical layer. At this stage, the data is in the shape of a transport block (TB). Generally, the number of bits contained in a transport block depends on the MCS and the number of resource blocks assigned, for example, to a UE for downlink transmission.

In LTE, transport blocks are typically further divided into smaller size code blocks (CB), which is referred as code block segmentation before being applied to channel coding/rate matching modules in the physical layer. In LTE, a minimum and maximum code block size is specified so the block sizes are compatible with the block sizes supported by a turbo interleaver used to spread out the code blocks over assigned resources. The minimum code block size is 40 bits and the maximum code block size is 6144 bits. Typically if the input transport block length is greater than the maximum code block size, the input block is segmented into multiple code blocks of the supported size. In case when no segmentation is needed, for example when the transport block size is smaller than the minimum defined code block size, only one code block is generated. If required, filler bits (e.g., zeros) are appended to the start of a code block segment so that the code block sizes match a set of valid turbo interleaver block sizes.

The code blocks undergo turbo coding, which is a form of forward error correction that improves the channel capacity by adding redundant information. Turbo coding typically includes a turbo interleaver that spreads out the code blocks over an assigned resource. The role of the interleaver is to spread the information bits such that in the event of a burst error, different code streams are affected differently, allowing data to still be recovered.

Figure 7:
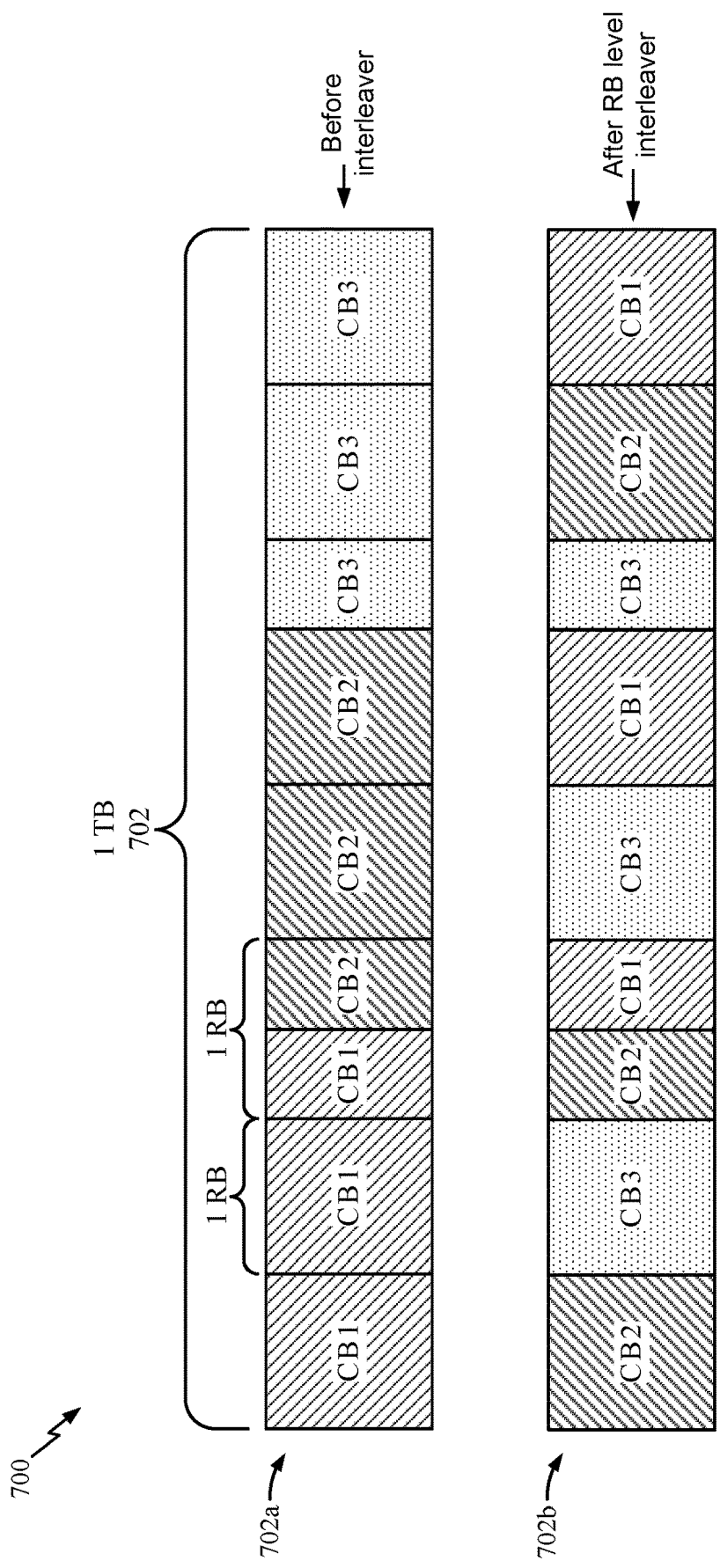
FIG. 7 illustrates example interleaving of code blocks, in accordance with certain aspects of the present disclosure.

FIG. 7 illustrates example interleaving 700 of code blocks, in accordance with certain aspects of the present disclosure. As shown in FIG. 7, TB 702 (e.g., in 702*a* and 702*b*) is divided into code blocks CB1, CB2 and CB3. 702*a* shows the resource allocation for the code blocks of TB 702 before interleaving and 702*b* shows the resource allocation for the code blocks of TB 702 after interleaving. As shown in 702*a*, before interleaving, each code block is allocated consecutive resources (e.g., consecutive RBs). As shown in 702*b*, each code block is spread over the available resources, by dividing each code block into different portions and allocating non-consecutive RBs to the different portions of the code block. For example, as shown, CB1 is divided into three portions and the portions of CB1 are allocated non-consecutive RBs.

Thus, interleaving code blocks to spread over allocated resources may achieve interference diversity and/or diversity due to frequency selective channel. However, using a code block interleaver may not always be beneficial, and in fact may reduce efficiency in certain conditions. For example, for small RB allocations or MTC (Machine Type Communication) applications with small data transfer (e.g., one or two CBs) it may be sufficient to allocate resources such that the CBs naturally spread over the resource allocation to achieve diversity. Code block interleaving may not be necessary in this case and may add unnecessary processing.

Another example, where code block interleaving may be avoided to speed up processing is in case of critical applications identified as having a higher priority than one or more other applications.

Certain aspects of the present disclosure provide techniques for managing code block interleaving more efficiently as compared to legacy systems. For example, these techniques include selectively disabling interleaving at transmitters and corresponding de-interleaving at receivers based on certain conditions to increase general efficiency of transmit and receive chains respectively.

FIG. 8 illustrates example operations 800, for example by a transmitter (e.g., a base station or a user equipment), for managing interleaving at the transmitter, in accordance with certain aspects of the present disclosure. Operations 800 begin, at 802, by detecting one or more conditions related to transmissions to be made from the transmitter. At 804, the transmitter may decide, based on the detection, to disable an interleaver while processing the transmissions, the interleaver used to spread code blocks over available resources.

For example, the transmitter may disable the interleaver while processing the transmissions upon detecting that an allocation of RBs for the transmissions is smaller than a predefined threshold RB allocation, detecting that a size of a determined transport block for the transmissions is smaller than a predefined threshold transport block size, or detecting that a particular resource allocation type (e.g., type 2) is to be used for the transmissions, or a combination thereof. For example, if X denotes RB allocation for the transmissions and Y denotes a predefined threshold RB allocation, the transmitter may disable its interleaver if X<Y. In certain aspects, as noted above, a combination of the above defined conditions may be used to trigger disabling of the interleaver. For example, a combination of X<Y and allocation type 2 being used may trigger the disabling of the interleaver for the transmissions. In certain aspects, the RB allocation threshold and TB size threshold are configurable and may be defined based, for example, on load conditions at the transmitter and/or receiver, channel conditions etc.

In certain aspects, the transmitter may disable the interleaver while processing transmissions, if it detects that the transmissions relate to a critical application identified as having a higher priority than one or more other applications. In an aspect, the transmitter may signal a target receiver that the transmissions relate to an identified critical application. In an aspect, one or more applications may be configured as critical applications and the transmitter and/or the receiver may be configured to identify these critical applications and disable the interleaver/de-interleaver semi-statically when transmissions relating to an identified critical application are being processed. In certain aspects, one or more applications may be designated as high priority applications (e.g., having a higher priority than one or more other applications) indicating that the applications are critical. For example, an application may be designated as a high priority application semi-statically (e.g., based on a nature of the application) or dynamically (e.g., based on current processing needs). In certain aspects, a transmitter may transmit an indication to a receiver that one or more transmissions from the transmitter relate to an application identified as having a higher priority than one or more other applications. The receiver, based on the indication, may determine that the transmitter disabled its interleaver when processing the transmissions, and may semi-statically disable its de-interleaver when processing those transmissions. The indication may include an identity of the application and/or a priority level associated with the application. In an aspect, priorities of one or more applications may be pre-assigned and both the transmitter and the receiver may store priority levels associated with applications. In this case, the transmitter only needs to transmit an indication including an identity of the application to which the transmissions corresponds to, and the receiver may locally determine the priority level of the identified application, and process the transmissions accordingly.

In certain aspects, a semi-static condition (e.g., configuration) means a condition which exists for a given time period and/or does not change too often (e.g., dynamically). For example, a semi-static configuration may be communicated to a receiver via semi-persistent scheduling (SPS) or via RRC signaling. SPS signaling includes signaling via PDCCH. In the above case the semi-static configuration may include a configuration to disable the interleaver/de-interleaver for a configured time period.

In certain aspects, the transmitter may indicate to a target receiver whether or not the interleaver was used while processing the transmissions via explicit signaling. For example, layer 1 control signaling such as PDCCH signaling may be used for providing such an indication to a target receiver.

FIG. 9 illustrates example operations 900, that may be performed by a receiver (e.g., a base station or a user equipment), for managing de-interleaving at the receiver for transmissions received from a transmitter, in accordance with certain aspects of the present disclosure.

Operations 900 begin, at 902, by detecting one or more conditions relating to transmissions received from a transmitter. At 904, the receiver may determine, based at least on the detection whether an interleaver was used to spread code blocks over available resources while processing the transmissions. At 906, the receiver may decide whether or not to de-interleave code blocks of the received transmissions based on the determination.

For example, the receiver may determine that the interleaver was not used at the transmitter while processing the received transmissions based on detecting that an allocation of RBs for the transmitter is smaller than a predefined threshold RB allocation, detecting that a size of a transport block used for the transmissions is smaller than a predefined threshold transport block size, or detecting that a particular resource allocation type was used for the transmissions, or a combination thereof. In an aspect, the receiver may decide not to de-interleave code blocks of the received transmissions based on the determination that the interleaver was not used at the transmitter while processing the transmissions.

In certain aspects, the receiver may determine that the interleaver was not used at the transmitter while processing the transmissions, based on detecting that the transmissions relate to a critical application identified as having a higher priority than one or more other applications. In an aspect, the receiver may receive an indication from the transmitter that the transmissions relate to a critical application.

In certain aspects, the receiver may determine whether or not an interleaver was used at the transmitter while processing the transmissions, based on explicit signaling (e.g., PDCCH signaling) from the transmitter indicating whether or not the interleaver was used for the transmissions.

In certain aspects, a transmitter may decide to disable its interleaver semi-statically for a given period of time that may be predetermined, for example, based on detecting one or more conditions discussed above or to increase processing speed. In an aspect, the transmitter may activate or deactivate the interleaver semi-statically using SPS (Semi-Persistent Scheduling) type of mechanism defined in LTE or via RRC signaling. In an aspect, SPS signaling is sent via PDCCH. In an aspect, the period of time for which the interleaver is to be disabled may be determined based on the one or more conditions discussed above.

In certain aspects, a receiver may receive an indication from the transmitter that the interleaver was semi-statically disabled at the transmitter for a given period of time. The receiver may disable a de-interleaver used to recover code blocks received over the available resources semi-statically for the given period. In an aspect, the indication from the transmitter may indicate that the interleaver was semi-statically disabled via semi-persistent scheduling.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications by a transmitter, comprising:
   detecting that a particular type of representation of a resource allocation will be used for scheduling transmissions to a target receiver;
   deciding, based on the detection of the particular type of representation of the resource allocation, to disable an interleaver while processing the transmissions, wherein the transmitter uses the interleaver to spread code blocks over available resources, wherein deciding to disable the interleaver comprises deciding to disable the interleaver semi-statically for a given period; and
   transmitting an indication to the target receiver, via semi-persistent scheduling (SPS) signaling, that the interleaver is disabled while processing the transmissions.

2. The method of claim 1, wherein the given period is determined based on one or more conditions.

3. A method for wireless communications by a receiver, comprising:
   receiving an indication from the transmitter, via semi-persistent scheduling (SPS) signaling, that the interleaver was semi-statically disabled at the transmitter for a given period;
   detecting that a particular type of representation of a resource allocation will be used for scheduling transmissions received from a transmitter;
   determining, based at least on the detection of the particular type of representation of the resource allocation, that an interleaver was disabled at the transmitter while processing the transmissions, wherein the transmitter uses the interleaver to spread code blocks over available resources; and
   deciding not to de-interleave code blocks of the received transmissions based on the determination.

4. The method of claim 3, further comprising semi-statically disabling a de-interleaver used to recover code blocks from the transmission, based on the indication.

5. An apparatus for wireless communications by a transmitter, comprising:
   means for detecting that a particular type of representation of a resource allocation will be used for scheduling transmissions to a target receiver;
   means for deciding, based on the detection of the particular type of representation of the resource allocation, to disable an interleaver while processing the transmissions, wherein the transmitter uses the interleaver to spread code blocks over available resources wherein the means for deciding to disable the interleaver is configured to decide to disable the interleaver semi-statically for a given period; and
   means for transmitting an indication to the target receiver, via semi-persistent scheduling (SPS) signaling, that the interleaver is disabled while processing the transmissions.

6. The apparatus of claim 5, wherein the given period is determined based on one or more conditions.

7. An apparatus for wireless communications by a receiver, comprising:
   means for receiving an indication from the transmitter, via semi-persistent scheduling (SPS) signaling, that the interleaver was semi-statically disabled at the transmitter for a given period;
   means for detecting that a particular type of representation of a resource allocation will be used for scheduling transmissions received from a transmitter;
   means for determining, based at least on the detection of the particular type of representation of the resource allocation, that an interleaver was disabled at the transmitter while processing the transmissions, wherein the transmitter uses the interleaver to spread code blocks over available resources; and
   means for deciding not to de-interleave code blocks of the received transmissions based on the determination.

8. The apparatus of claim 7, further comprising means for semi-statically disabling a de-interleaver used to recover code blocks from the transmission, based on the indication.

* * * * *

UNITED STATES PATENT AND TRADEMARK OFFICE
CERTIFICATE OF CORRECTION

Page 1 of 2

PATENT NO. : 11,272,380 B2
APPLICATION NO. : 15/604417
DATED : March 8, 2022
INVENTOR(S) : Tao Luo It is certified that error appears in the above-identified patent and that said Letters Patent is hereby corrected as shown below:

In the Claims

In Claim 3 replace "receiving an indication from the transmitter, via semi-persistent scheduling (SPS) signaling, that the interleaver was semi-statically disabled at the transmitter for a given period" with -- receiving an indication from a transmitter, via semi-persistent scheduling (SPS) signaling, that an interleaver was semi-statically disabled at the transmitter for a given period --

In Claim 3 replace "detecting that a particular type of representation of a resource allocation will be used for scheduling transmissions received from a transmitter" with -- detecting that a particular type of representation of a resource allocation will be used for scheduling transmissions received from the transmitter --

In Claim 3 replace "determining, based at least on the detection of the particular type of representation of the resource allocation, that an interleaver was disabled at the transmitter while processing the transmissions, wherein the transmitter uses the interleaver to spread code blocks over available resources" with -- determining, based at least on the detection of the particular type of representation of the resource allocation, that the interleaver was disabled at the transmitter while processing the transmissions, wherein the transmitter uses the interleaver to spread code blocks over available resources --

In Claim 7 replace "means for receiving an indication from the transmitter, via semi-persistent scheduling (SPS) signaling, that the interleaver was semi-statically disabled at the transmitter for a given period" with -- means for receiving an indication from a transmitter, via semi-persistent scheduling (SPS) signaling, that an interleaver was semi-statically disabled at the transmitter for a given period --

In Claim 7 replace "means for detecting that a particular type of representation of a resource allocation will be used for scheduling transmissions received from a transmitter" with -- means for detecting that a particular type of representation of a resource allocation will be used for scheduling transmissions received from the transmitter --

Signed and Sealed this
Eighteenth Day of February, 2025

Coke Morgan Stewart
*Acting Director of the United States Patent and Trademark Office*

CERTIFICATE OF CORRECTION (continued)
U.S. Pat. No. 11,272,380 B2

In Claim 7 replace "means for determining, based at least on the detection of the particular type of representation of the resource allocation, that an interleaver was disabled at the transmitter while processing the transmissions, wherein the transmitter uses the interleaver to spread code blocks over available resources" with -- means for determining, based at least on the detection of the particular type of representation of the resource allocation, that the interleaver was disabled at the transmitter while processing the transmissions, wherein the transmitter uses the interleaver to spread code blocks over available resources --